United States Patent [19]

Schmitt et al.

[11] Patent Number: 4,798,627

[45] Date of Patent: Jan. 17, 1989

[54] DAMPENING AGENT FOR OFFSET PRINTING

[75] Inventors: Dieter Schmitt, Darmstadt; Manfred Urban, Weiterstadt, both of Fed. Rep. of Germany

[73] Assignee: Merck Patent Geselschaft Mit Beschrankter Haftung, Darmstadt, Fed. Rep. of Germany

[21] Appl. No.: 918,245

[22] Filed: Oct. 14, 1986

[30] Foreign Application Priority Data

Oct. 12, 1985 [DE] Fed. Rep. of Germany ....... 3536485

[51] Int. Cl.[4] ........................... C09D 5/20; B32B 9/00

[52] U.S. Cl. .................................... 106/2; 106/14.14; 106/14.25; 106/14.39; 106/14.5; 148/6.14 R; 428/469

[58] Field of Search .............. 106/2, 14.5, 1.13, 14.25, 106/14.14, 14.39; 148/6.14 R; 428/469

[56] References Cited

U.S. PATENT DOCUMENTS

| | | | |
|---|---|---|---|
| 2,219,977 | 10/1940 | Brill | 148/6.14 R |
| 2,250,508 | 7/1941 | Thompson | 148/6.14 R |
| 2,412,200 | 12/1946 | Blum | 106/14.5 |
| 2,978,361 | 4/1961 | Seidl | 148/6.14 R |
| 3,284,249 | 11/1966 | Osborn | 148/6.14 R |
| 4,282,811 | 8/1981 | Kuzuwata et al. | 106/2 |

FOREIGN PATENT DOCUMENTS

| | | | |
|---|---|---|---|
| 0132594 | 2/1985 | European Pat. Off. | 106/1.13 |

*Primary Examiner*—Theodore Morris
*Attorney, Agent, or Firm*—Millen & White

[57] ABSTRACT

Dampening agents or dampening agent concentrates for offset printing are disclosed which contain copper ions as corrosion inhibitors. Such dampening agents exhibit virtually no corrosive action on the offset printing machine parts with which they come into contact, in particular the printing cylinders made of nickel metal.

32 Claims, No Drawings

DAMPENING AGENT FOR OFFSET PRINTING

BACKGROUND OF THE INVENTION

The present invention relates to dampening agents or dampening agent concentrates for offset printing. In the course of applying printing ink to the printing plates enclamped on the printing cylinders, offset printing needs so-called "dampening water" in order to keep the non-image areas on the printing plates free from printing ink. Herein it is necessary for the quality of the print that the dampening water or agent thoroughly wet the non-image areas on the printing plates and, furthermore, become properly emulsified with the printing ink applied in the image areas. Such dampening agents for offset printing essentially consist of water, to which have been added customarily low amounts of modifying additives such as pH-regulating substances, humectants, wetting agents, film formers, preservatives and also, if desired, water-miscible organic solvents.

The dampening water is customarily prepared before printing by the printer himself. The modifying additives being in the meantime present predominantly in the form of premanufactured dampening water additives or dampening agent concentrates available from the relevant specialist suppliers, and need only be added to water or be diluted with water.

It is predominantly an essential requirement for dampening agents which are to be used in offset printing that they have a stable pH value in the acid range, for example about pH 3-6, but usually about pH 4-5.5. This is normally achieved by buffer systems based on polycarboxylic acids or polyhydroxycarboxylic acids and salts thereof. The most frequent buffer system is sodium citrate/citric acid.

However, such dampening agents can lead to corrosion phenomena on the printing machine parts with which they come into contact, in particular on the printing cylinders, which are predominantly made of nickel metal or have a nickel coating. Herein the corrosion problems can range from the dissolving of nickel metal on the cylinder surfaces to serious cases of pitting, predominantly in the contact areas between printing plates and printing cylinders. The consequences are dimensional changes which can have an adverse effect on the quality of the printed product, shorter operating lives of the printing cylinders, and also reduced runs, ranging to serious damagetto the printing machines.

There has accordingly been no shortage of attempts to reduce the corrosive properties of the dampening agents by means of various corrosion inhibitors. For instance, corrosion inhibitors have been added to the dampening agents such as, for example, organic zinc salts such as zinc gluconate and zinc glucoheptonate, water-soluble inorganic polyphosphates, phenylarsonic acid and derivatives thereof, propargyl compounds, thiourea and derivatives thereof. According to EP No. 108883, the addition of 1H-benzotriazole is supposed to have a marked corrosion-inhibiting effect. However, as stated there and as confirmed in in-house experiments, the inhibitor action of 1H-benzotriazole is only acceptably adequate in the relatively weakly acidic medium around pH 5 and higher, but is insufficient in the case of dampening agents at a lower pH value. All the known corrosion inhibitors are thus known to have in common that, although they offer a certain degree of corrosion protection, they do not inhibit corrosion completely, in particular not over a wider pH range. This is in particular also true when the dampening agents have been made up with demineralized water and have a pH value of distinctly below 5. There thus continues to exist in the printing industry a particular need for dampening agents for offset printing which have at least distinctly reduced corrosive properties.

SUMMARY OF THE INVENTION

It is an object of this invention to provide corrosion inhibitors for use in dampening water for printing processes.

Another object of this invention is to provide a corrosion inhibitor for use in dampening water which is effective over a wider pH range than known corrosion inhibitors.

Another object of this invention is to provide dampening agents or dampening agent concentrates which exhibit a low corrosive action on metals, especially nickel metal.

Upon further study of the specification and appended claims, further objects and advantages of this invention will become apparent to those skilled in the art.

It has now been found, surprisingly, that dampening agents of a composition known per se exhibit virtually no corrosive action on nickel metal when they further contain copper ions. It is not, as was found in numerous expeiiments, the exact amount of copper ions in the ready-to-use dampening agent which is significant, but, on the contrary, the fact of their presence is important. It was totally unforeseeable that even very small amounts of copper ions in the ready-to-use dampening agent, for example of the order of 0.1 ppm, effect a considerable reduction in nickel depletion. Furthermore, it was found that the corrosion-inhibiting action is enhanced by the additional presence of silicate ions, for example of the order of 1-1000 ppm.

The invention thus provides dampening agents or dampening agent concentrates for offset printing which contain copper ions.

The invention further provides dampening agents or dampening agent concentrates for offset printing which in addition contain silicate ions.

The invention additionally provides a process for preventing corrosion in offset printing machines caused by dampening agents, wherein copper ions are added to the dampening agents or dampening agent concentrates to be used.

By adding, as the invention provides, even very small amounts of copper ions, for example in the form of watersoluble copper salts, the corrosive action on nickel metal of the known offset printing dampening agents of any desired composition can be drastically reduced or virtually completely inhibited. Contents of about 0.01-100 ppm, preferably 0.1-10 ppm, of copper ions in the ready-to-use dampening agent have been found to be effective in all cases. Thus, for example, a content of only 0.1 ppm of copper ions in the ready-to-use dampening agent causes a reduction in nickel depletion by about 90% compared with a corresponding dampening agent which contains no corrosion inhibitors of any kind. The corrosion inhibitor 1H-benzotriazole known from EP 108883, by contrast, even in the concentration of 0.01% (~100 ppm), which is higher by several powers of ten, brings about a reduction in nickel depletion by only about 60%. Higher contents of copper ions in the ready-to-use dampening agent, for example of the order of 1-10 ppm, are even more effective. However, still higher concentrations are generally not economical. Nickel depletion is inhibited virtually completely when the dampening agent additionally contains silicate ions, for example on the order of about 1-1000 ppm, preferably 10-500 ppm.

The copper ion and, optionally, silicate ion quantities which are required for corrosion inhibition can be added in the form of corresponding salts to the ready-to use dampening agents of customary composition before the actual use in printing. Suitable are in principle all copper salts which are problemlessly water-soluble, are compatible with the dampening effect and which set free copper ions in the aqueous medium. The same applies to the silicate compounds to be used. Although the valence of the copper and the silicate ions has not been found to be critical, the copper ions, preferably, are present as cupric ($Cu^{2+}$) ions and the silicate ions are present as metasilicate ($SiO_3{}^{2-}$) ions. Highly suitable copper salts are, for example, copper sulphate, copper nitrate, copper acetate and copper chloride. Preferred silicate ion donors are, for example alkali metal silicates such as sodium silicate and potassium silicate.

It is advantageous and customary to prepare the dampening agent from corresponding dampening agent concentrates and water immediately before use in offset printing. Dampening agent concentrates are customarily concentrated aqueous solutions, but occasionally are also solid, pulverulent, tabletted or pasty products which contain the additions required for dampening agents in offset printing. These concentrations are used to prepare the ready-to-use dampening agents by diluting or dissolving in water to give, for example, about 1-10% strength, preferably 2-5% strength, solutions. Owing to the locally different and frequently varying process water qualities and their known difficult-to-assess influence, via the dampeing agents, on the printed product, it is advisable to prepare the dampening agents with treated water, preferably demineralized water or water of 8°-12° German hardness.

The dampening agent concentrates generally contain usually empirically determined, frequently variable amounts of a very wide range of substances which control the properties of the dampening agent. They virtually always contain pH regulators which customarily bring about a pH value within the range of about 3-6, usually around pH 5. Citrate buffers are predominantly used for this purpose. These concentrates can further contain humectants, usually based on polyalcohols such as glycols, glycerol, sorbitol, hexitol or polyglycols, film formers such as gum arabic, wetting agents such as, for example, cationic, anionic, non-ionic or amphoteric surfactants, preferably non-ionic surfactants, and frequently also softening agents, for example complexing agents such as ethylenediaminetetraacetic acid (EDTA). In addition these concentrates usually also contain, in order to prolong the shelf life, commercially available preservatives which have an antimicrobial and/or antimycotic action. Frequently such dampening agent concentrates also contain, in order to ensure uniform solution of the various ingredients, solubilizing substances such as, for example, water-compatible organic solvents, usually alcohols such as methanol, ethanol or isopropanol.

The present invention proposes, then, that such dampening agent concentrates can also have advantageously added to them sufficient quantities of copper ions and, if necessary, also of silicate ions for corrosion prevention. In these concentrates, the content of copper ions is about 0.1-1000 ppm, preferably 1-500 ppm, and the content of silicate ions is about 10-10000 ppm, preferably 100-5000 ppm. Typical dampening agent concentrates according to the invention containing for example about 5%-15% by weight, preferably about 10% by weight, of glycerol, about 2-10% by weight, preferably about 5% by weight, of citrate buffer, about 1-5% by weight, preferably about 3% by weight, of gum arabic, about 1% by weight of preservative, about 3-10% by weight, preferably about 5% by weight, of isopropanol and also about 0.0001-0.05% by weight of copper nitrate (corresponding to about 1-500 ppm of copper ions) and, if desired, about 0.01-0.5% by weight of sodium silicate (corresponding to about 10-5000 ppm of silicate ions).

According to the invention, dampening agent concentrates are now available to those skilled in the art for preparing dampening agents for offset printing which, owing to the inventive content of copper ions, exhibit virtually no corrosive action on the offset printing machine parts which come into conaact with them, in particular on the printing cylinders made of nickel metal.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the preceding text and the following examples, all temperatures are set forth uncorrected in degrees Celsius and all parts and percentages are by weight; unless otherwise indicated.

EXAMPLE 1

A dampening agent concentrate is prepared from

| | |
|---|---|
| 10% | by weight of glycerol |
| 7.5% | by weight of citric acid |
| 2% | by weight of sodium hydroxide |
| 2% | by weight of gum arabic |
| 5% | by weight of isopropanol |
| 0.5% | by weight of non-ionic surfactant (ethylene oxide-propylene oxide copolymer) |
| 1% | by weight of fungicide |
| 0.001% | by weight of copper nitrate |
| Remainder: | demineralized water |

The solution has a pH value of 4.0. It is used in the form of a 4% strength aqueous solution (in demineralized water) as a dampening agent in the known way in offset printing.

EXAMPLE 2

A dampening agent concentrate is prepared from

| | |
|---|---|
| 25% | by weight of glycerol |
| 5% | by weight of citric acid |
| 1.3% | by weight of sodium hydroxide |
| 1% | by weight of polypropylene glycol 3020 |
| 1% | by weight of polyethylene glycol 1000 |
| 0.5% | by weight of fungicide |
| 0.001% | by weight of copper nitrate |
| 0.01% | by weight of sodium silicate |
| Remainder: | demineralized water |

The solution has a pH value of 4.2. It is used in the form of a 4% strength aqueous solution (in demineralized water) as a dampening agent in the known way in offset printing.

EXAMPLE 3

Trial

First a dampening agent concentrate was prepared as in Example 1, but without copper nitrate. It was used to prepare a series of dampening agents in the form of 4% strength aqueous solutions. To this dampening agent were then added, partly in different concentrations, corrosion inhibitors according to the invention and also known corrosion inhibitors.

Nickel tubes of 3 cm in diameter were then immersed to a depth of about 4 cm in these test solutions and were exposed for a prolonged period to the action of the stirred respective solution.

By periodically precision weighing the nickel tubes and also quantitatively determining the nickel content in the solutions, the average nickel depletion in gram per square meter and day was determined as a measure of the corrosiveness. Table 1 below shows the results.

TABLE 1

| Solution no. | Corrosion inhibitor | Nickel depletion |
|---|---|---|
| 1 | None | 9 $g/m^2 \cdot day$ |
| 2 | 0.02% of potassiumtripolyphosphate | 9 $g/m^2 \cdot day$ |
| 3 | 0.004% of 1H—benzotriazole | 3.5 $g/m^2 \cdot day$ |
| 4 | 0.01% of 1H—benzotriazole | 3.1 $g/m^2 \cdot day$ |
| 5 | 0.00001% of $Cu^{2+}$ (as nitrate) | 1.1 $g/m^2 \cdot day$ |
| 6 | 0.0001% of $Cu^{2+}$ (as nitrate) | 1.0 $g/m^2 \cdot day$ |
| 7 | 0.0001% of $Cu^{2+}$ (as acetate) | 0.8 $g/m^2 \cdot day$ |
| 8 | 0.001% of $Cu^{2+}$ (as nitrate) | 0.6 $g/m^2 \cdot day$ |
| 9 | 0.01% of $Cu^{2+}$ (as nitrate) + 0.01% of silicate (as sodium silicate) | 0.4 $g/m^2 \cdot day$ |
| 10 | 0.01% of silicate (as sodium silicate) | 6.3 $g/m^2 \cdot day$ |

The results obtained with solutions nos. 1 to 4 show that using the known corrosion inhibitors a reduction in nickel depletion of about 65% is possible.

Compared with the dampening agent sample without corrosion inhibitor (no. 1), the inventive addition of copper ions (solution no. 5 to 8) leads to a reduction in nickel depletion by about 88-93%.

The inventive combination of copper ions and silicate ions (no. 9) leads to a reduction in nickel depletion by 96%, while the presence of silicate alone (no. 10) only brings about a reduction by about 30%.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In an aqueous dampening agent useful in offset printing and containing a humectant and a pH regulator, said dampening agent having a pH of about 3-6, the improvement wherein said agent includes an amount of copper ion which is anticorrosively effective.

2. A dampening agent according to claim 1, wherein said agent includes 0.01-100 ppm of copper ions.

3. A dampening agent according to claim 1, wherein said agent includes 0.1-10 ppm of copper ions.

4. A dampening agent of claim 1, further comprising an amount of silicate ions which is anticorrosively effective.

5. A dampening agent according to claim 2, further comprising about 10-500 ppm of silicate ions.

6. A dampening agent according to claim 2, further comprising about 1-1000 ppm of silicate ions.

7. A dampening agent according to claim 3, further comprising about 1-500 ppm of silicate ions.

8. A dampening agent according to claim 3, comprising about 10-500 ppm of silicate ions.

9. A dampening agent according to claim 1, wherein said dampening agent has a pH of about 5.

10. In a dampening agent concentrate for use in preparing a dampening agent, said dampening agent concentrate containing a pH regulator for bringing the pH of an aqueous dampening agent to a value of about 3-6 and a humectant, the improvement wherein the concentrate contains an amount of copper ions which is anticorrosively effective.

11. An agent concentrate of claim 10, wherein the amount of copper ions is abotu 0.1-1000 ppm.

12. A dampening agent concentrate according to claim 11, wherein the amount of copper ions is about 1-500 ppm of copper ions.

13. A dampening agent concentrate according to claim 10, further comprising about 10-10000 ppm of silicate ions.

14. A dampening agent concentrate according to claim 12, further comprising about 10-10000 ppm of silicate ions.

15. A dampening agent concentrate according to claim 13, comprising about 100-5000 ppm of silicate ions.

16. A dampening agent concentrate according to claim 14, comprising about 100-5000 ppm of silicate ions.

17. A dampening agent concentrate comprising about 5-15% by weight glycerol, about 2-10% by weight citrate buffer, about 1-5% by weight gum arabic, about 1% by weight of preservative, about 3-10% by weight isopropanol and about 0.0001-0.05% by weight of copper nitrate.

18. A dampening agent concentrate according to claim 17, wherein said concentrate contains about 1-500 ppm copper ions.

19. A dampening agent concentrate according to claim 17, further comprising about 0.01-0.5% by weight sodium silicate.

20. A process for reducting corrosion caused by dampening agents in offset printing machines, said dampening agent containing a humectant and a pH regulator, said process comprising providing an anti-ocorrosively effective amount of copper ions in the dampening agent and bringing said dampening agent into contact with an offset printing machine.

21. A process according to claim 20, wherein during the offset printing process, said dampening agent comes into cotnact with nickel metal of said printing machines and said dampening agent is effective to reduce corroision of said nickel metal of said printing machines.

22. A process for reducing corrosion caused by dampening agents in offset printing machines, comprising providing an anticorrosively effective amount of copper ions in the ampening agent, wherein said dampening agent is prepared from a dampening agent concetrate according to claim 17.

23. A process for reducing corrosion caused by dampening agents in offset printing machines, comprising providing an anticorrosively effective amount of copper ions in the dampening agent, wherein said dampening agent is prepared from a dampening agent concentrate according to claim 18.

24. A process for reducing corrosion caused by dampening agents in offset printing machiens, comprising providing an anticorrosively effective amount of copper ions in the dampening agent, wherein said dampening agent is prepared from a dampening agent concentrate according to claim 19.

25. In a process comprising operating an offset printing machine with a dampening agent, said dampening agent containing a humectant and a pH regulator, the improvement wherein said dampening agent comprises an effective amount of copper ions to prevent corrosiion of parts of said offset printing machine in contact with said dampening agent, and wherein the dampening agent is prepared prior to use by adding to water a composition containing said copper ions.

26. A process according to claim 25, wherein said parts of said offset printing machine comprise nickel and said dampening agent further comprises silciate ions.

27. An aqueous dampening agent according to claim 1, further comprising a film former, a wetting agent and a preservative.

28. A dampening agent concentrate according to claim 10, further comprising a film former, a wetting agent and a preservative.

29. An aqueous dampening agent according to claim 27, further comprising a softening agent and a solubilizing agent.

30. A dampening agent concentrate according to claim 28, further comprising a softening agent and a solubilizing agent.

31. In a process of offset printing wherein a dampening agent is applied to printing plates so as to keep non-image areas of the printing plates free from printing ink, said dampening agent capable of throughly wetting the non-image areas of the printing plate and capable of emulsifying with the printing ink applied to image areas of the printing plate, the imrpovement wherein said agent includes an amount of copper ions effective to reduce corrosion of offset printing machines caused by said dampening agent without deleteriously affecting the dampening properties of said dampening agent.

32. In an aqueous dampening agent containing a humetant and a pH regulator having a pH of about 3–6, said dampening agent being useful in offset printing for keeping non-image areas of printing plates free from printing ink while also capable of being emulsified with printing ink applied to image areas of said printing plates, the improvement wherein said agent includes an amount of copper ions which is anticorrosively effective.

* * * * *

UNITED STATES PATENT AND TRADEMARK OFFICE
CERTIFICATE OF CORRECTION

PATENT NO. : 4,798,627

DATED : January 17, 1989

INVENTOR(S) : Schmitt et al

It is certified that error appears in the above-identified patent and that said Letters Patent is hereby corrected as shown below:

On the Title Page, Item [73] Assignee:

Reads: "Merck Patent Geselschaft Mit Beschrankter Haftung, Darmstadt, Fed. Rep. of Germany"

should Read: --Merck Patent Gesellschaft Mit Beschrankter Haftung, Darmstadt, Fed. Rep. of Germany--

Signed and Sealed this

Eleventh Day of July, 1989

*Attest:*

DONALD J. QUIGG

*Attesting Officer*

*Commissioner of Patents and Trademarks*